US012643591B2

(12) United States Patent
Pagee

(10) Patent No.: US 12,643,591 B2
(45) Date of Patent: Jun. 2, 2026

(54) TRANSPORT SLED

(71) Applicant: Jason Pagee, Beaver County (CA)

(72) Inventor: Jason Pagee, Beaver County (CA)

( * ) Notice: Subject to any disclaimer, the term of this patent is extended or adjusted under 35 U.S.C. 154(b) by 308 days.

(21) Appl. No.: 18/436,179

(22) Filed: Feb. 8, 2024

(65) Prior Publication Data

US 2025/0256756 A1      Aug. 14, 2025

(51) Int. Cl.
B62B 15/00 (2020.01)
B62B 17/06 (2006.01)
B62B 17/08 (2006.01)

(52) U.S. Cl.
CPC ............ B62B 15/007 (2013.01); B62B 17/06 (2013.01); B62B 17/08 (2013.01)

(58) Field of Classification Search
CPC ...... B62B 15/007; B62B 17/005; B62B 17/08
See application file for complete search history.

(56) References Cited

U.S. PATENT DOCUMENTS

| | | | | |
|---|---|---|---|---|
| 4,730,569 A | * | 3/1988 | Colson .................... | B62B 15/00 280/28.12 |
| 5,285,936 A | * | 2/1994 | Matricardi, Jr. .......... | B62B 1/12 280/30 |
| 5,653,455 A | * | 8/1997 | Richards ................. | B62B 5/068 280/1.5 |
| 6,880,834 B2 | * | 4/2005 | Fitzgerald ............... | B62B 13/14 280/18 |

| | | | | |
|---|---|---|---|---|
| 7,086,654 B2 | * | 8/2006 | Sellers .................... | B62B 15/00 280/18 |
| 8,556,276 B2 | * | 10/2013 | Bengtzen ................. | A45C 9/00 280/30 |
| 8,662,506 B2 | * | 3/2014 | Bengtzen ................. | A45C 5/04 280/30 |
| 8,910,956 B2 | * | 12/2014 | Bengtzen ................ | B62B 1/186 280/30 |
| 10,479,154 B2 | * | 11/2019 | Butler .................... | B60F 3/0092 |
| 10,696,318 B2 | * | 6/2020 | Ruiz ....................... | B62B 13/06 |
| 10,889,314 B2 | * | 1/2021 | Kowalski .............. | B62B 15/003 |
| 10,946,886 B2 | * | 3/2021 | Cunningham .......... | B62B 17/06 |
| 2011/0226003 A1 | * | 9/2011 | Chaney .................... | B62B 1/20 62/457.7 |
| 2013/0249176 A1 | * | 9/2013 | Bengtzen ................. | B62B 1/20 280/30 |
| 2017/0113118 A1 | * | 4/2017 | Michaels, III ....... | A63C 5/0417 |

(Continued)

*Primary Examiner* — Jeffrey J Restifo
(74) *Attorney, Agent, or Firm* — Orin Del Vecchio

(57) ABSTRACT

A transport sled that is configured to receive and retain items such as but not limited to hunting gear, camping equipment and wild game within an interior cavity thereof. The transport sled includes a body having a bottom portion and a top portion wherein the top portion is hingedly secured to the bottom portion. The bottom portion is concave in form having an outer surface configured to slidably traverse across a snow covered surface. The top portion is hexagonal dome shaped forming an interior cavity. The top portion includes storage compartments operable to receive and retain items proximate thereto. The body includes stationary members movably coupled to the rear end of the body. The stationary members move between a first position and a second position wherein in the second position the teeth members of the stationary members engage the snow covered surface to inhibit movement of the transport sled.

10 Claims, 4 Drawing Sheets

(56) References Cited

U.S. PATENT DOCUMENTS

| | | | |
|---|---|---|---|
| 2021/0171084 A1* | 6/2021 | Bankhead | B62B 15/008 |
| 2022/0119030 A1* | 4/2022 | Maillard | B62B 13/16 |
| 2024/0425097 A1* | 12/2024 | King | B62B 13/06 |
| 2025/0256756 A1* | 8/2025 | Pagee | B62B 15/007 |
| 2025/0320746 A1* | 10/2025 | Moore | E04H 15/06 |

* cited by examiner

TRANSPORT SLED

FIELD OF THE INVENTION

The present invention relates generally to load carrying apparatus, more specifically but not by way of limitation, a transport sled configured to assist an individual carrying items such as but not limited to equipment for hunting and camping and further provide transport of wild game across various surface types such as but not limited to snow.

BACKGROUND

When individuals hunt or camp in remote areas, they must have an ability to transport the necessary gear to the desired location. While during some seasons of the year vehicles such as but not limited to all terrain vehicles can be utilized there are some seasons during the year or areas desired to be accessed wherein motorized vehicles may not be capable of being utilized. During the winter months, the snow in some parts of North America can hinder operation of various vehicles. Additionally, many desired remote hunting locations may be inaccessible by motorized vehicles and it can be further desired to reduce noise pollution for hunters entering an area in which they desire to hunt.

There are various types of conventional sleds that are configured to have objects placed thereon and drug by a user to a desired location. These conventional sleds however have some intrinsic problems that result in some inconveniences for the users thereof. Most conventional sleds are built with elongated runners on the bottom which makes certain directional movements challenging. Additionally, these conventional sleds are typically flat platforms and as such any gear placed thereon can become entangled with items such as but not limited to low branches on trees which can inhibit or increase the difficulty in traversing in a desired direction. Furthermore, the open sled platform provides no protection for any of the gear disposed thereon. Lastly, conventional sleds will slide down hillsides and the like in directions potentially not desired by the user as these sleds do not have elements to maintain the sled in a stationary position when not being drug by a user.

Accordingly, there is a need for a transport sled that is configured to provide transportation of items such as but not limited to hunting gear, camping equipment and wild game wherein the present invention provides an enclosed storage compartment to protect the aforementioned and wherein the present invention includes elements to maintain the sled in a stationary position on an inclined area.

SUMMARY OF THE INVENTION

It is the object of the present invention to provide a transport sled that is configured to provide transportation items such as but not limited to hunting gear, camping equipment and wild game wherein the present invention includes a body wherein the body includes a bottom portion and a top portion.

Another object of the present invention is to provide a sled that is configured to assist a user transport items across a snow covered surface wherein the top portion of the body is hingedly coupled to the bottom portion along a lateral side edge thereof.

A further object of the present invention is to provide a transport sled that is configured to provide transportation items such as but not limited to hunting gear, camping equipment and wild game wherein the bottom portion of the body has an outer surface shaped to slidably traverse across a snow covered surface.

Yet a further object of the present invention is to provide a sled that is configured to assist a user transport items across a snow covered surface wherein the present invention further includes a plurality of stationary members secured to the rear end of the body wherein the stationary members are movable between a first position and a second position.

Still another object of the present invention is to provide a transport sled that is configured to provide transportation items such as but not limited to hunting gear, camping equipment and wild game wherein the body is dome hexagonal in shape in the preferred embodiment thereof providing an interior cavity operable to receive and store objects therein.

An additional object of the present invention is to provide a sled that is configured to assist a user transport items across a snow covered surface wherein the body has secured thereto a tow member wherein the tow member is operably coupled to the front end of the body.

Yet a further object of the present invention is to provide a transport sled that is configured to provide transportation items such as but not limited to hunting gear, camping equipment and wild game wherein the inner surface of the top portion of the body is configured with a plurality of storage compartments operable to have various objects releasably secured therein.

Still another object of the present invention is to provide a sled that is configured to assist a user transport items across a snow covered surface wherein the top portion of the body can have a seat molded into the wall thereof.

An additional object of the present invention is to provide a transport sled that is configured to provide transportation items such as but not limited to hunting gear, camping equipment and wild game wherein the body of the present invention is manufactured from a rigid lightweight material such as but not limited to plastic.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
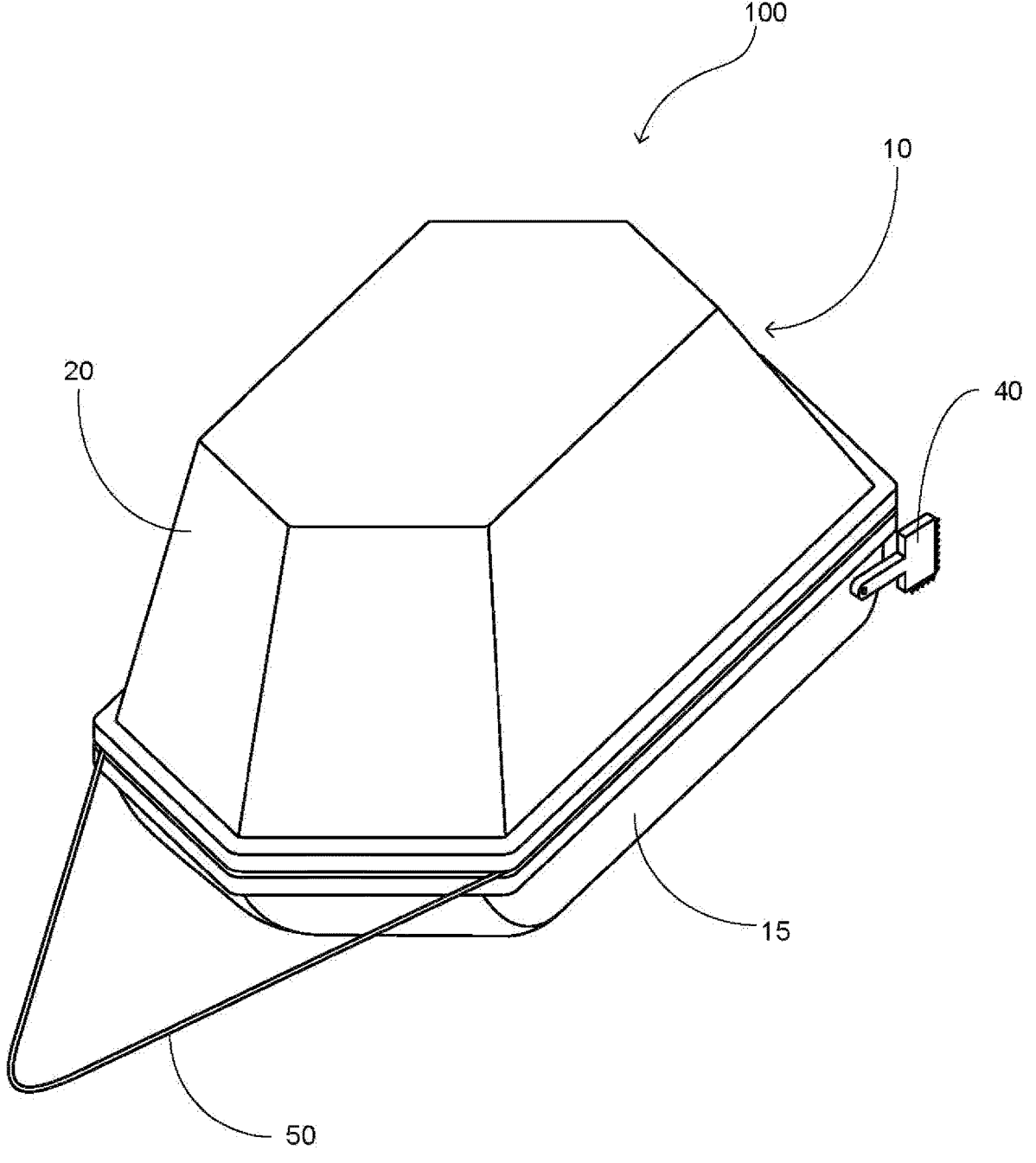
FIG. 1 is a perspective view of the present invention with the body in a closed position.
Figure 2:
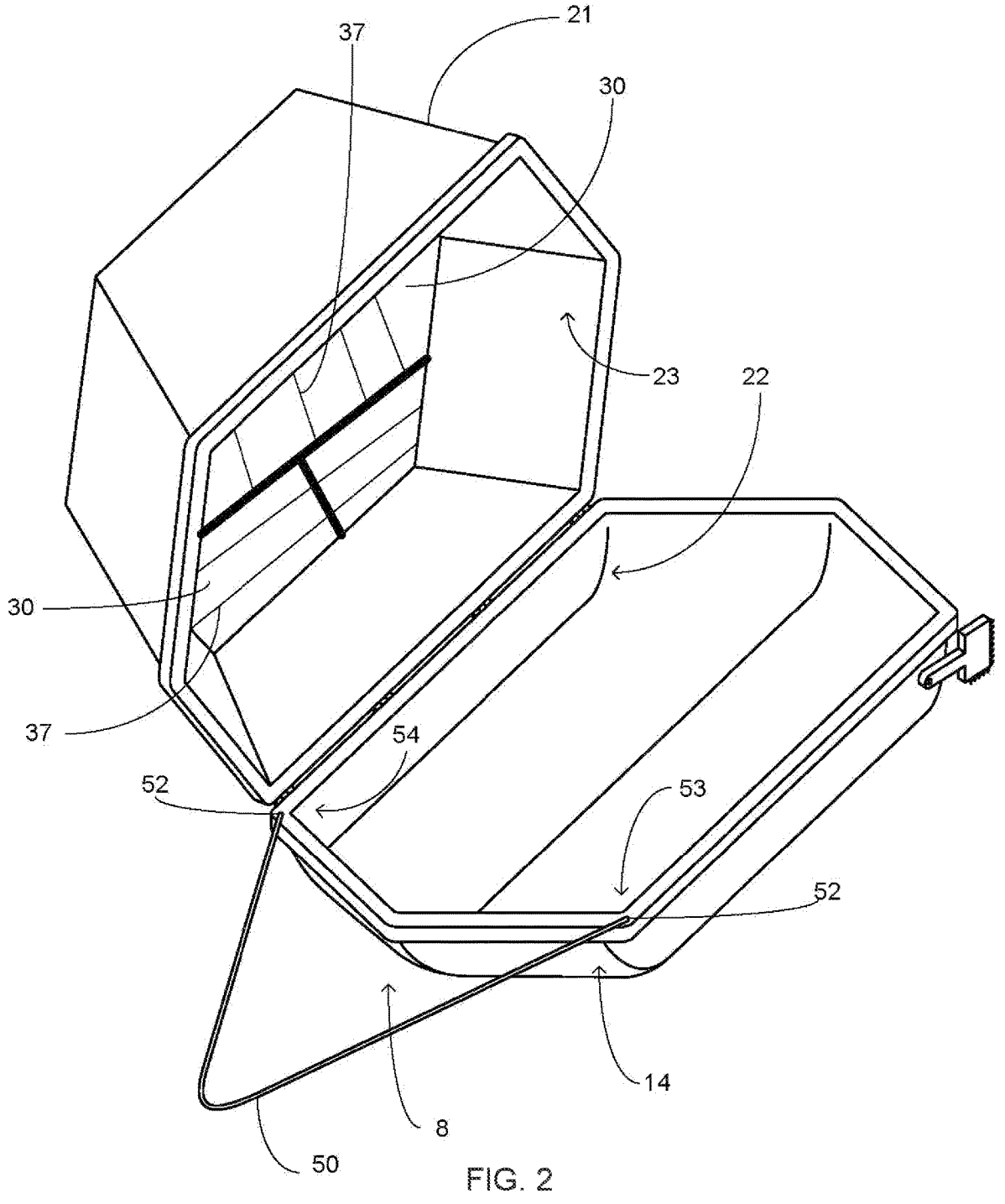
FIG. 2 is a perspective view of the present invention with the body in an open position.
Figure 3:
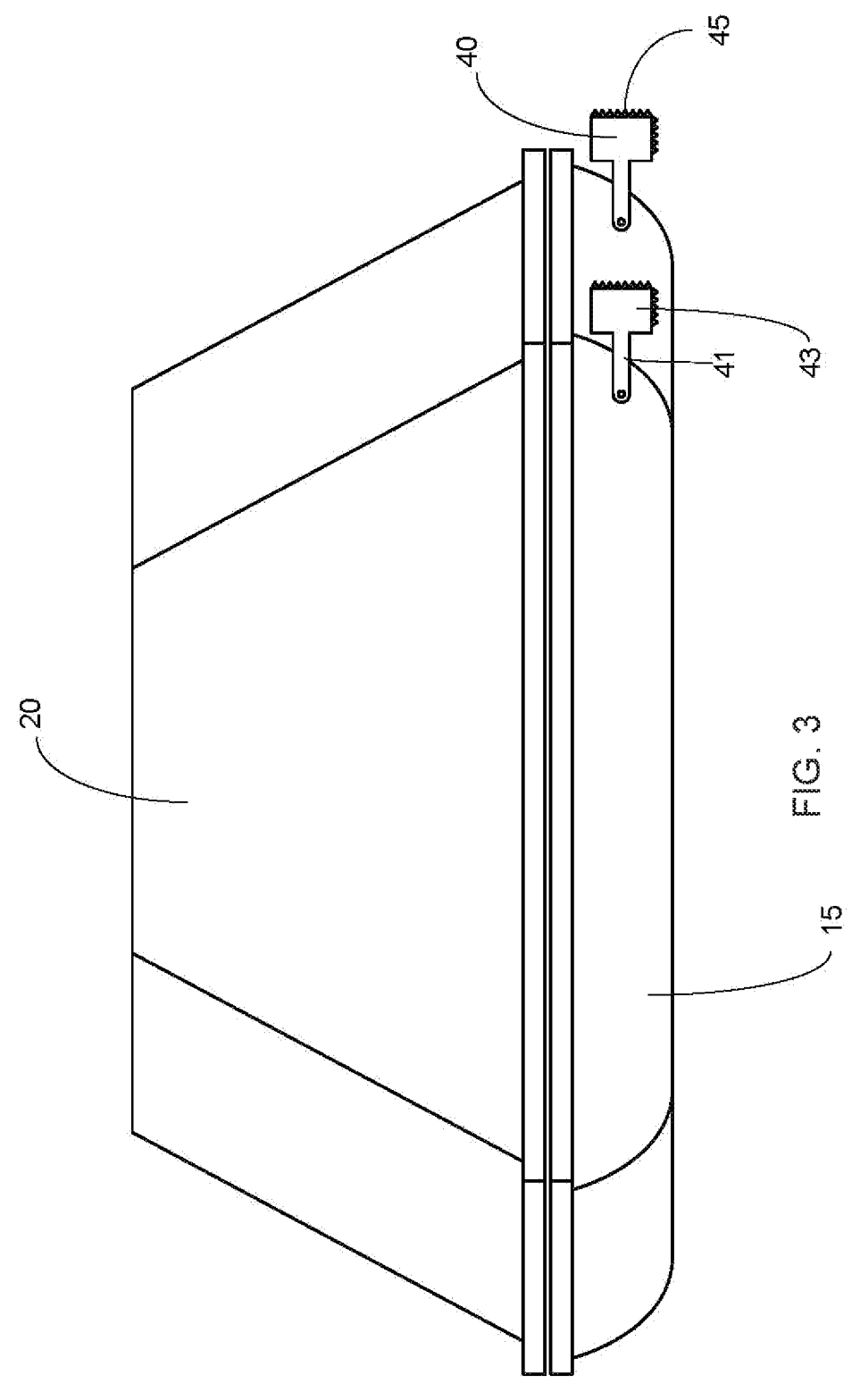
FIG. 3 is a side rear view of the present invention illustrating the stationary members thereof.
Figure 4:
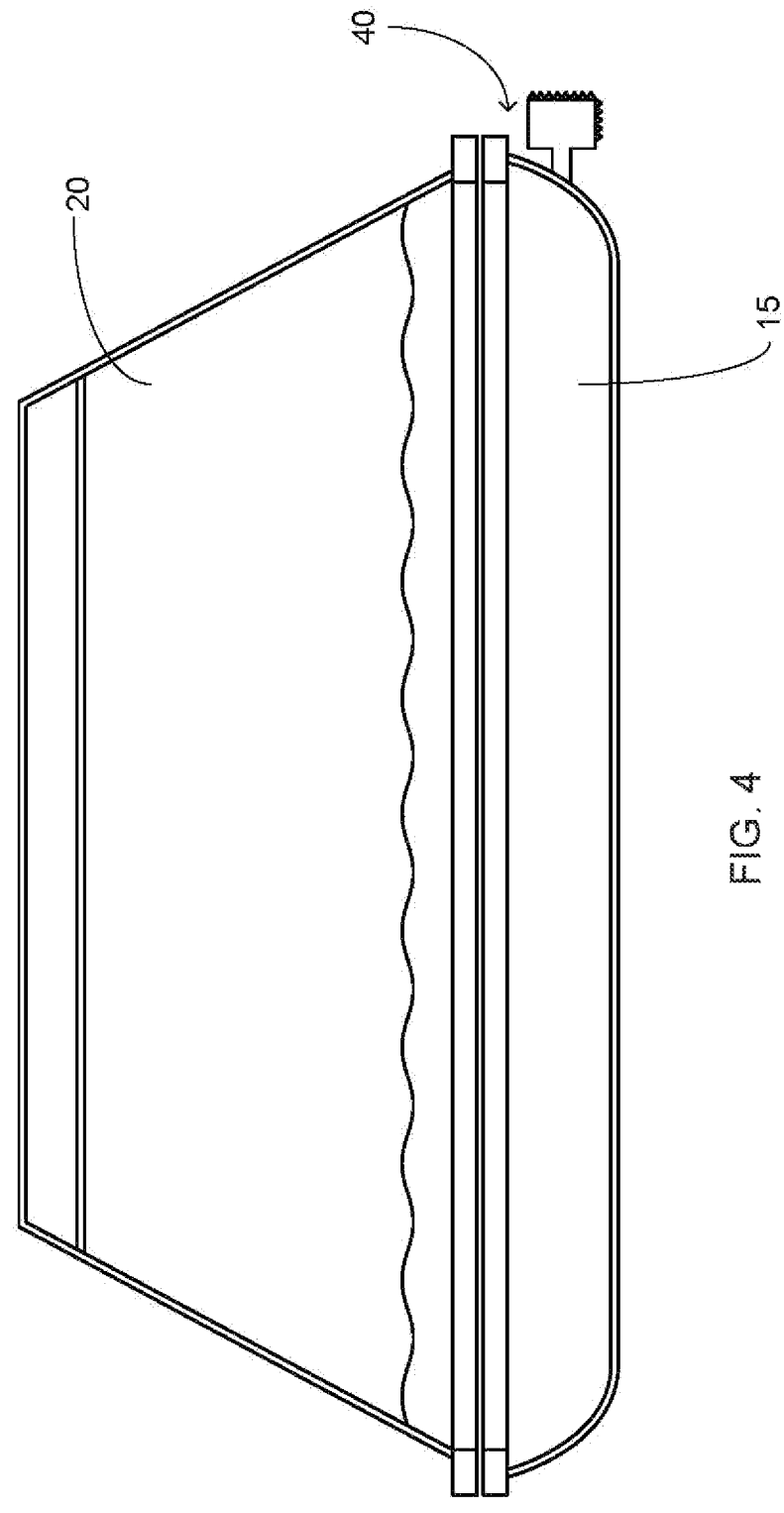
FIG. 4 is a side view of the present invention with the body in a closed position.

Referring now to the drawings submitted herewith, wherein various elements depicted therein are not necessarily drawn to scale and wherein through the views and figures like elements are referenced with identical reference numerals, there is illustrated a transport sled 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the transport sled 100 includes a body 10 wherein the body 10 is comprised of a bottom portion 15 and a top portion 20. It should be understood within the scope of the present invention that the body 10 is manufactured from a durable lightweight rigid material such as but not limited to plastic. It is further contemplated within the scope of the present invention that the body 10 is provided in alternate sizes. The top portion 20 is hingedly secured to the bottom portion 15 providing access to the interior cavity 22. The top portion 20 includes an outer wall 21 forming a hexagonal dome-like shape that is operable to provides the interior cavity 22. While a hexagonal dome-like shape is the preferred embodiment for the top portion 20, it should be understood within the scope of the present invention that the top portion 20 could be provided in alternate shapes.

Formed on the inner surface 23 of the outer wall 21 of the top portion 20 are storage compartments 30. Storage compartments 30 are formed on the inner surface 23 utilizing suitable techniques. The storage compartments 30 can be provided in alternate sizes and shapes in order to receive and retain objects such as but not limited to hunting gear and camping equipment. Retention members 37 are positioned across the openings 29 of the storage compartments 30. The retention members 37 are operable to secure items within the storage compartments 30 when the top portion 20 is placed in its closed position. The retention members 37 are manufactured from suitable materials such as but not limited to nylon straps and are secured at the ends thereof with suitable mechanical fasteners. It should be understood within the scope of the present invention that the retention members 37 could be releasably secured at at least one end thereof so as to facilitate placement of items within the storage compartments 30. Alternate elements such as but not limited to elastic nets could be employed in place of and/or in conjunction with the retention members 37 to retain the objects disposed within the storage compartment 30 close to the inner surface 23 so as to ensure the object remains in a desired position to provide maximum cubic footage for the interior cavity. While a certain quantity of storage compartments 30 have been illustrated herein, it should be understood within the scope of the present invention that the transport sled 100 could be configured with various quantities of storage compartments 30 and furthermore it should be understood that the storage compartments 30 could be provided in alternate sizes and shapes.

Operably coupled to the bottom portion 15 of the body 10 are the stationary members 40. The stationary members 40 are movable from a first position to a second position wherein in the second position the teeth members 45 of the stationary members 40 are oriented in a downwards direction so as to engage the surface on which the transport sled 100 is being traversed across. The stationary members 40 include an upper section 41 that is secured to the bottom portion 15 employing a suitable mechanical fastener. The upper section 41 has a lower section 43 that is contiguously formed therewith wherein the lower section 43 has a width that is greater than that of the upper section 41. The teeth members 45 are formed along the bottom edge of the lower section 43 and a generally jagged in form. The teeth members 45 are configured to engage with the snow covered surface on which the transport sled 100 is being traversed when the transport sled 100 is placed on an inclined surface and no forward movement of the transport sled 100 is occurring. The stationary members 40 hinge downward to their second position upon no upward force being applied thereto that occurs when the transport sled 100 is being slidably traversed across a snow covered surface. Upon the forward motion of the transport sled 100 stopping, the stationary members 40 will move to the second position wherein the teeth members will engage the snow covered surface and inhibit backwards movement of the transport sled 100 when the transport sled 100 is on an inclined surface. It is contemplated within the scope of the present invention that the transport sled 100 could have as few as one stationary member 40 or more than two stationary members 40. Furthermore, while a particular shape of the stationary member 40 has been illustrated herein, it should be understood within the scope of the present invention that the stationary members 40 could be constructed in alternate forms and achieve the desired objective discussed herein.

The bottom portion 15 includes outer surface 14 that is shaped so as to slidably traverse across a snow covered surface. The bottom portion 15 is shaped so as to facilitate improved sliding in forward and lateral directions. The bottom portion 15 is concave in form so as to maximize the cubic footage of the interior cavity 22. While not particularly illustrated herein, it is contemplated within the scope of the present invention that the bottom portion could further be equipped to have wheel members (not illustrated herein)

releasably secured thereto so as to facilitate traversal of the transport sled 100 across alternate surfaces to snow covered surfaces. Operably coupled to the front end 8 of the body 10 is the tow member 50. The tow member 50 is manufactured from suitable materials such as but not limited to nylon rope. The tow member 50 is coupled with swivel couplings 52 so as to allow multi-directional movement thereof during use of the transport sled 100 so as to maintain the tow member 50 in a desirable position while pulling the transport sled 100 across a snow covered surface. The tow member 50 is operably coupled to the transport sled 100 in a first location 53 and a second location 54 along the front end 8 wherein the attachment configuration provides improved control of the transport sled 100 during pulling of the transport sled 100 across a snow covered surface. It is contemplated within the scope of the present invention that the tow member 50 could be manufactured from alternate materials and be provided in various lengths.

While not particularly illustrated herein, it is contemplated within the scope of the present invention that the top portion 20 could have a seat member molded thereinto that is operable to provide a surface area sufficient in size for a user of the transport sled 100 to superpose themselves thereon. The seat member could be molded into the front area of the top portion 20 and would include a surface area that is horizontal in manner so as to provide a surface for a user to sit thereon. It is further contemplated within the scope of the present invention that the seat member could be formed in alternate locations of the top portion 20. Furthermore, it should be understood within the scope of the present invention that the top portion 20 could have more than one seat member formed thereon.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A transport sled configured to receive and retain objects therein wherein the transport sled is operable to traverse across a snow covered surface wherein the transport sled comprises:

a body, said body having a front end and a rear end, said body having a bottom portion and a top portion, said top portion being hingedly coupled to said bottom portion, said bottom portion and said top portion being shaped to create an interior cavity, said interior cavity being of suitable size to accommodate objects therein;

at least one storage compartment, said at least one storage compartment being formed on an inner surface of said top portion, said at least one storage compartment operable to retain an receive an item and maintain the item proximate to said inner surface of said top portion;

at least one stationary member, said at least one stationary member being movably coupled to said rear end of said body, said at least one stationary member configured to be moved between a first position and a second position, said at least one stationary member having an upper section and a lower section, said lower section having a bottom edge wherein said bottom edge further includes teeth members formed thereon; and wherein in said second position said at least one stationary member is angled downwards so as to facilitate engagement of said teeth members with the snow covered surface.

2. The transport sled configured to receive and retain objects therein as recited in claim 1, wherein said top portion of said body further includes a wall, said wall forming a hexagonal dome shape of the top portion.

3. The transport sled configured to receive and retain objects therein as recited in claim 2, wherein said at least one stationary member is movably secured to said rear end of said body.

4. The transport sled configured to receive and retain objects therein as recited in claim 3, wherein in said first position, said at least one stationary position is generally horizontal with the snow covered surface.

5. The transport sled configured to receive and retain objects therein as recited in claim 4, and further including a tow member, said tow member being operably coupled to said front end of said body.

6. The transport sled configured to receive and retain objects therein as recited in claim 5, wherein said bottom portion of said body is concave so as to form an interior cavity thereof.

7. The transport sled configured to receive and retain objects therein as recited in claim 6, wherein said bottom portion of said body includes an outer surface, said outer surface being shaped to be slidably traversed across the snow covered surface.

8. The transport sled configured to receive and retain objects therein as recited in claim 7, wherein said tow member is secured to said front end at a first location and a second location.

9. The transport sled configured to receive and retain objects therein as recited in claim 8, wherein said at least one storage compartment further includes at least one retention member operably secured across an opening of said at least one storage compartment.

10. The transport sled configured to receive and retain objects therein as recited in claim 9, wherein said lower section of said at least one stationary member has a width that is greater than that of a width of the upper section of the at least one stationary member.

* * * * *